US007005833B2

(12) United States Patent
Adams

(10) Patent No.: US 7,005,833 B2
(45) Date of Patent: Feb. 28, 2006

(54) METHOD OF AND APPARATUS FOR DETECTING SENSOR LOSS IN A GENERATOR CONTROL SYSTEM

(75) Inventor: Christopher John Adams, Barton-le-Clay (GB)

(73) Assignee: Goodrich Control Systems Limited, Luton (GB)

( * ) Notice: Subject to any disclaimer, the term of this patent is extended or adjusted under 35 U.S.C. 154(b) by 133 days.

(21) Appl. No.: 10/720,291

(22) Filed: Nov. 24, 2003

(65) Prior Publication Data

US 2004/0113592 A1 Jun. 17, 2004

(30) Foreign Application Priority Data

Nov. 25, 2002 (GB) .................................... 0227461

(51) Int. Cl.
*H02P 9/10* (2006.01)

(52) U.S. Cl. .......................................... 322/37; 322/25

(58) Field of Classification Search .................. 322/22, 322/25, 27, 28, 44, 59, 37
See application file for complete search history.

(56) References Cited

U.S. PATENT DOCUMENTS

| | | | | |
|---|---|---|---|---|
| 5,013,995 | A * | 5/1991 | Rashid | 322/25 |
| 5,216,350 | A * | 6/1993 | Judge et al. | 322/25 |
| 5,554,923 | A * | 9/1996 | Maddali et al. | 322/25 |
| 5,617,011 | A * | 4/1997 | Hammer et al. | 322/28 |
| 5,801,516 | A * | 9/1998 | Rice et al. | 322/37 |
| 5,929,610 | A * | 7/1999 | Friedlander et al. | 322/37 |
| 5,973,481 | A * | 10/1999 | Thompson et al. | 322/7 |
| 6,118,260 | A * | 9/2000 | Kirkpatrick et al. | 323/312 |
| 6,184,661 | B1 * | 2/2001 | Becker et al. | 322/25 |
| 6,489,692 | B1 * | 12/2002 | Gilbreth et al. | 290/52 |
| 6,867,569 | B1 * | 3/2005 | Taniguchi et al. | 322/28 |

* cited by examiner

*Primary Examiner*—Nicholas Ponomarenko
(74) *Attorney, Agent, or Firm*—Wolf, Greenfield & Sacks, P.C.

(57) ABSTRACT

A generator controller (4) is provided which is able to detect and respond to failure of a generator output voltage sensor, whilst being able to distinguish voltage sensor failure from output voltage collapse due to the presence of an overload or short circuit condition. The presence of a voltage sensor failure is indicated by the measured output voltage being below a first voltage threshold whilst the output current is also below a current threshold.

16 Claims, 5 Drawing Sheets

METHOD OF AND APPARATUS FOR DETECTING SENSOR LOSS IN A GENERATOR CONTROL SYSTEM

FIELD OF THE INVENTION

The present invention relates to a method of and an apparatus for detecting sensor loss, and in particular voltage sensor loss, in a generator control system.

BACKGROUND OF THE INVENTION

It is desirable to be able to control the output of a generator so as to maintain the voltage produced by the generator within acceptable limits. However generator output voltage may vary with generator speed and electrical load. A variable frequency electrical generator is shown in FIG. 1. The generator comprises a pilot exciter 1 in the form of a permanent magnetic generator (PMG) having a permanent magnetic rotor 2 co-operating with a three phase stator winding 3. Power from the stator winding 3 is provided to a stator field winding 5 of a main exciter 6 via a generator controller 4. The main exciter 6 has a three phase rotor winding 7 arranged to supply current to a main rotor winding 9 via a half wave bridge rectifier 8. The main rotor winding 9 co-operates with a three phase main stator winding 10 which is connected to the generator output 11. The permanent magnetic rotor 2, the exciter rotor winding 7 and the main rotor winding 9 are attached to a common shaft 12 so as to rotate together. The shaft 12 is connected via suitable coupling means (for example a gear box) to a prime mover, such as a gas turbine aero engine. The generator controller 4 is connected to the output of the generator stator windings so as to monitor the output voltage produced by the generator.

It is known to reduce the current supplied to the stator field winding 5 of the exciter if the generator voltage rises above an acceptable threshold. Similarly, it is known to increase the current supplied to the stator exciter winding 5 if the output voltage of the generator falls below an acceptable voltage. Measurements of generator output voltage may be performed on a time averaged basis and also on a peak basis. Whilst this control system works well, there is a risk that complete failure of or a poor or broken connection to the generator output voltage sensing system within the controller 4 could result in the generator voltage becoming unregulated and raising to a level where equipment supplied by the generator may become damaged.

SUMMARY OF THE INVENTION

According to a first aspect of the present invention there is provided a method of detecting sensor failure of a generator control system having at least one voltage sensor for measuring a generator output voltage and at least one current sensor for measuring a generator output current, wherein sensor failure is indicated if, during operation of the generator, the measured generator output voltage is less than a first voltage threshold and the measured generator output current is less than a current threshold.

It is thus possible to provide a method of detecting failure of the generator measurement systems, and in particular the voltage detection arrangement, within a generator control system.

Preferably a purality of voltage sensors are provided. Thus, in the context of a three phase generator a voltage sensor may be provided to measure the voltage of each generator phase. The highest voltage occurring on any of the phases may then be used as a measurement of the generator output voltage. Thus this arrangement provides for sensor redundancy since the failure of any two of the three sensors can be tolerated. It might initially be supposed that detection of sensor failure could merely be performed by looking for a sudden reduction of measured output voltage. However such a system would have difficulty in rapidly discriminating between voltage sensor failure and output voltage collapse due to the occurrence of a large load or of a short circuit. It is important to be able to discriminate between a short circuit at the output of the generator and voltage sensor loss because they are treated differently by the generator control unit. If a short circuit load occurs then the generator should be isolated from the load but the load should not be distributed to other generators. However a voltage sensor loss would require immediate shut down of the generator but the load supplied by the generator can be transferred to other generators.

The present invention discriminates between voltage sensor failure and transitory high load conditions resulting in reduction of the generator output voltage or short circuit conditions by monitoring the generator output current. If the generator output voltage is below or equal to the first voltage threshold and the current is larger than the current threshold then a generator overload is indicated. However, if the voltage output of the generator is measured to be below or equal to the first voltage threshold and the current output is less than or equal to the current threshold then a sensor fault is indicated.

In the case of an overload being detected, other protection circuitry would be operated to protect the generator depending on the nature of the overload and/or to shed load from the generator, with some of the loads possibly being transferred to other power supplies depending on the topology of the circuit being supplied by the generator.

Advantageously the method of detecting sensor failure is temporarily modified during generator start up. It should be appreciated that during generator start up the output voltage and output current from the generator are low thereby giving rise to the possibility that the method according to the present invention would erroneously indicate generator sensor failure as having occurred even when the sensors are functioning correctly. Preferably the output voltage of the generator is sampled or measured after a first time period following initiation of generator voltage regulation. If, at the first time period, the output voltage of the generator has risen to greater than a second voltage threshold then the voltage sensors are assumed to be functioning correctly. Preferably a second period of time is then allowed to elapse before the sensor detection method according to the first aspect of the present invention is initiated. However, if the sensor voltage fails to meet the second voltage threshold after the first period of time then it is assumed that the voltage sensors have failed and a generator shut down procedure is initiated.

According to a second aspect of the present invention there is provided a generator control system having at least one voltage sensor for measuring a generator output voltage and at least one current sensor for measuring a generator output current, wherein the generator control system is arranged to shut down a controlled generator if the measured generator output voltage is less than a first voltage threshold and the measured generator output current is less than a current threshold.

It is thus possible to provide a generator controller which can distinguish the difference between a reduction of measured generator output voltage due to a large or short circuit load occurring at the output of the generator and a reduction of measured generator output voltage resulting from voltage sensor failure. Voltage sensor failure may result from failure of connections to the voltage sensors as well as failure of the sensors themselves or components responsive to the voltage sensors.

BRIEF DESCRIPTION OF THE DRAWINGS

It will be appreciated that the voltage measuring system provided for the generator is in fact very robust and highly unlikely to fail. However, there is always a possibility that human error may result in the voltage measuring system failing to be connected to the generator control unit following maintenance or servicing of the generator. Thus the generator controller according to the present invention provides protection against excessive generator voltages which may occur as a result of the inadvertent failure to reconnect the generator sensing system. The system of voltage sensor loss detection would still work if all the current sensors failed or were inadvertently disconnected.

The present invention will further be described by way of example, with reference to the accompanying drawings, in which.

DETAILED DESCRIPTION

Figure 1:
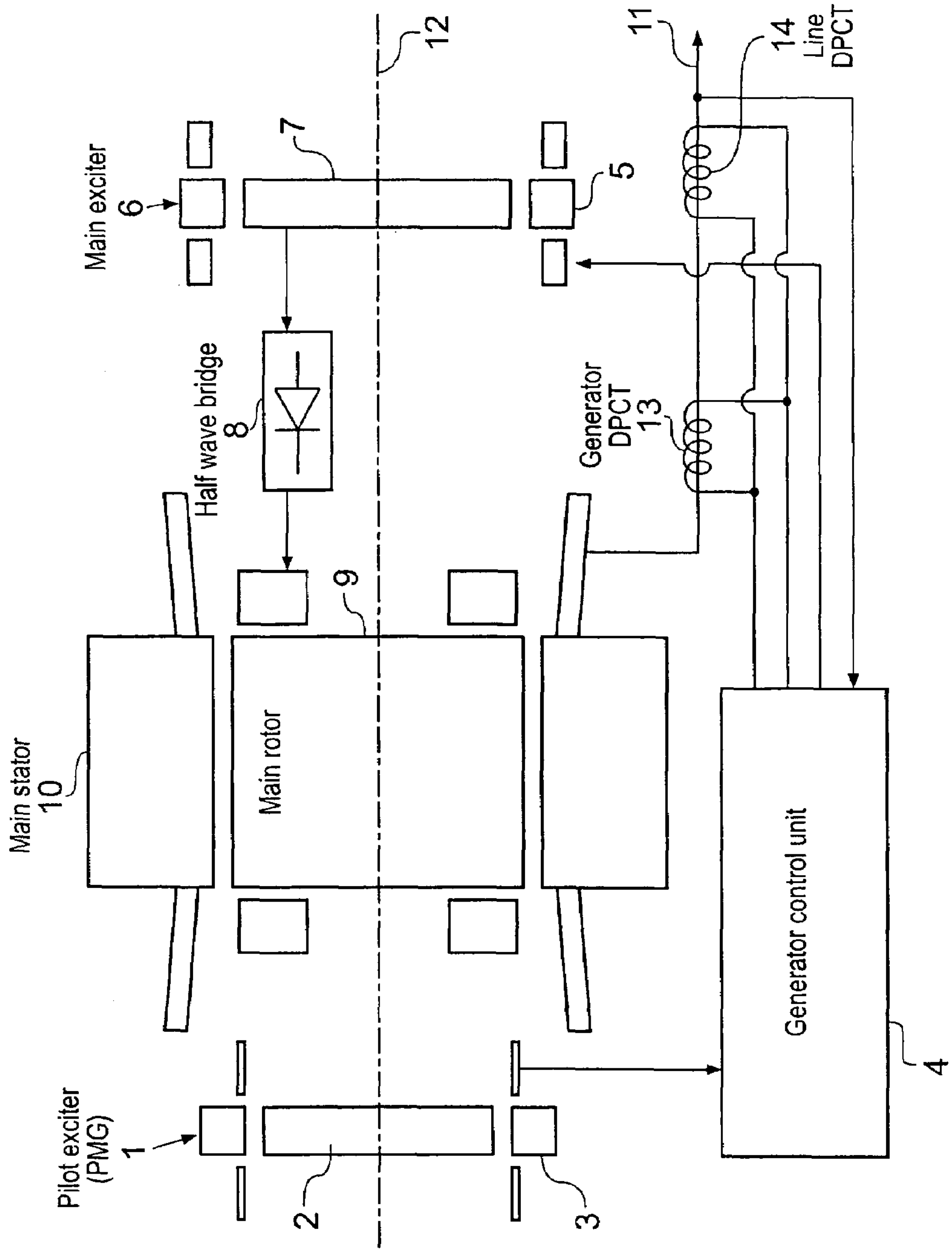
FIG. 1 schematically illustrates a three stage generator.
Figure 2:
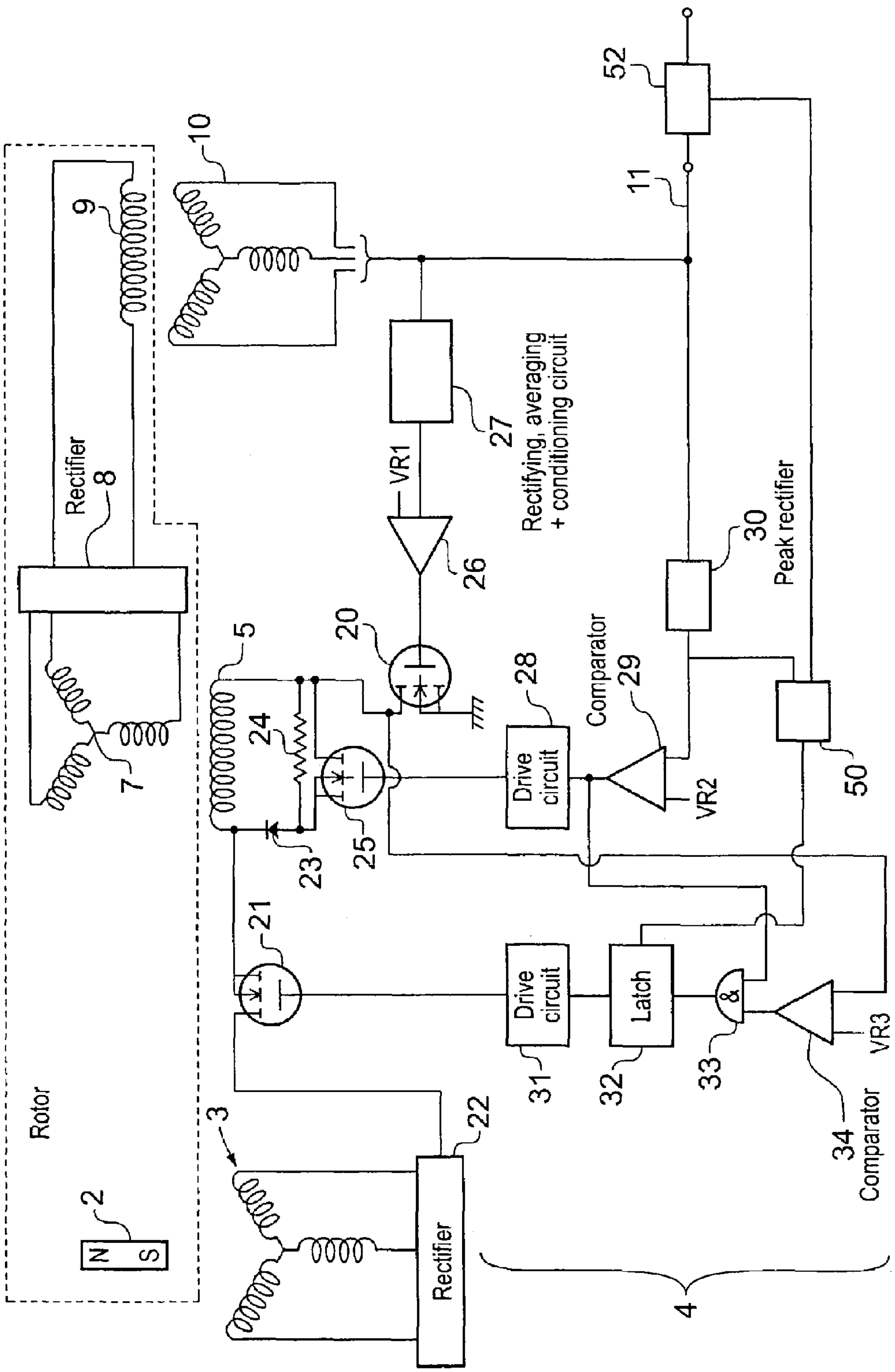
FIG. 2 illustrates a generator control circuit in greater detail.

FIG. 2 shows the control unit 4 of FIG. 1 in more detail. The main exciter winding 5 has a first end thereof connected via a field effect transistor 21 to the output of a rectifier 22 which receives and rectifies the output of the permanent magnet generator stator windings 3. A second end of the main exciter stator winding 5 is connected to ground via a second field effect transistor 20. The main exciter stator winding 5 is also connected in parallel with a series circuit comprising a diode 23 and a parallel circuit comprising a resistor 24 and a field effect transistor 25.

The gate of the field effect transistor 20 is, connected to the output of a differential amplifier 26 having a first input connected to receive a first reference voltage VR1 and a second input connected to a rectifying averaging and conditioning circuit 27 which itself is connected to the generator output 11. Alternatively, RMS voltage sensing may be used as an input to the amplifier 26. The gate of transistor 25 is connected to the output of a drive circuit 28 whose input is connected to the output of a comparator 29 which has a first input connected to the output of a peak rectifier 30. An input of the peak rectifier 30 is connected to the generator output 11. The comparator 29 has a second input connected to a second reference voltage VR2.

The gate of transistor 21 is connected to the output of a drive circuit 31 which in turn is connected to the output of a latch 32. The input of the latch is connected to the output of an AND gate 33 having a first input connected to the output of the comparator 29 and a second input connected to the output of a further comparator 34. The comparator 34 has a first input connected to receive a third reference voltage VR3 and the second input connected to a node formed between the winding 5 and the field effect transistor 20.

During operation of the generator the transistors 21 and 25 are switched on so that the output of the rectifier 22 is supplied to the winding 5 and the resistor 24 is short circuited. The differential amplifier 26 compares the output voltage of the generator with a reference voltage VR1 representing the target output voltage and controls the transistor 20 so as to regulate the main exciter field by varying the current through the exciter stator winding 5. The current supplied by the rotor winding 7 via the rectifier 8 to the rotor winding 9 is thus controlled so as to vary the output of the main stator winding 10 in order to regulate the generator output voltage at the generator output 11.

The peak rectifier 30 monitors the instantaneous peak output voltage of the generator output 11. When this voltage exceeds a predetermined level represented by a voltage reference VR2, the comparator 29 switches the transistor 25 off via the drive circuit 28 so that the resistor 24 becomes connected in series with the current recirculating path of the winding 5. The differential amplifier 26 will have also been arranged to have switched off the transistor 20 so as to remove drive to the winding 5. The recirculating current within the winding 5 is thus dissipated in the resistor 24 relatively rapidly so as to prevent the instantaneous peak output voltage of the generator from exceeding a permissible value.

The comparator 34 compares the voltage at one end of the field winding with the reference voltage VR3 in order to detect the occurrence of a short circuit from the end of the field winding 5 to ground. When such a short circuit is detected and when the comparator 29 signals that a large instantaneous peak output voltage has occurred, the AND gate 33 triggers the latch 32 thereby removing drive from the transistor 21. Drive to the exciter winding 5 is thus removed and cannot be restored until the latch 32 is reset.

Whilst control circuits of this type work well, they have no inherent protection against failure of the voltage sensors to circuits 27 and 30. This can however be rectified by incorporating a further logic block 50 which is responsive to the output of the peak rectifier 30 and also to a current measuring device 52. An output of the further logic block 50 can be supplied to the latch 32 giving the logic block 50 the authority to operate the latch 32 so as to inhibit current flow through the transistor 21.

Figure 3:
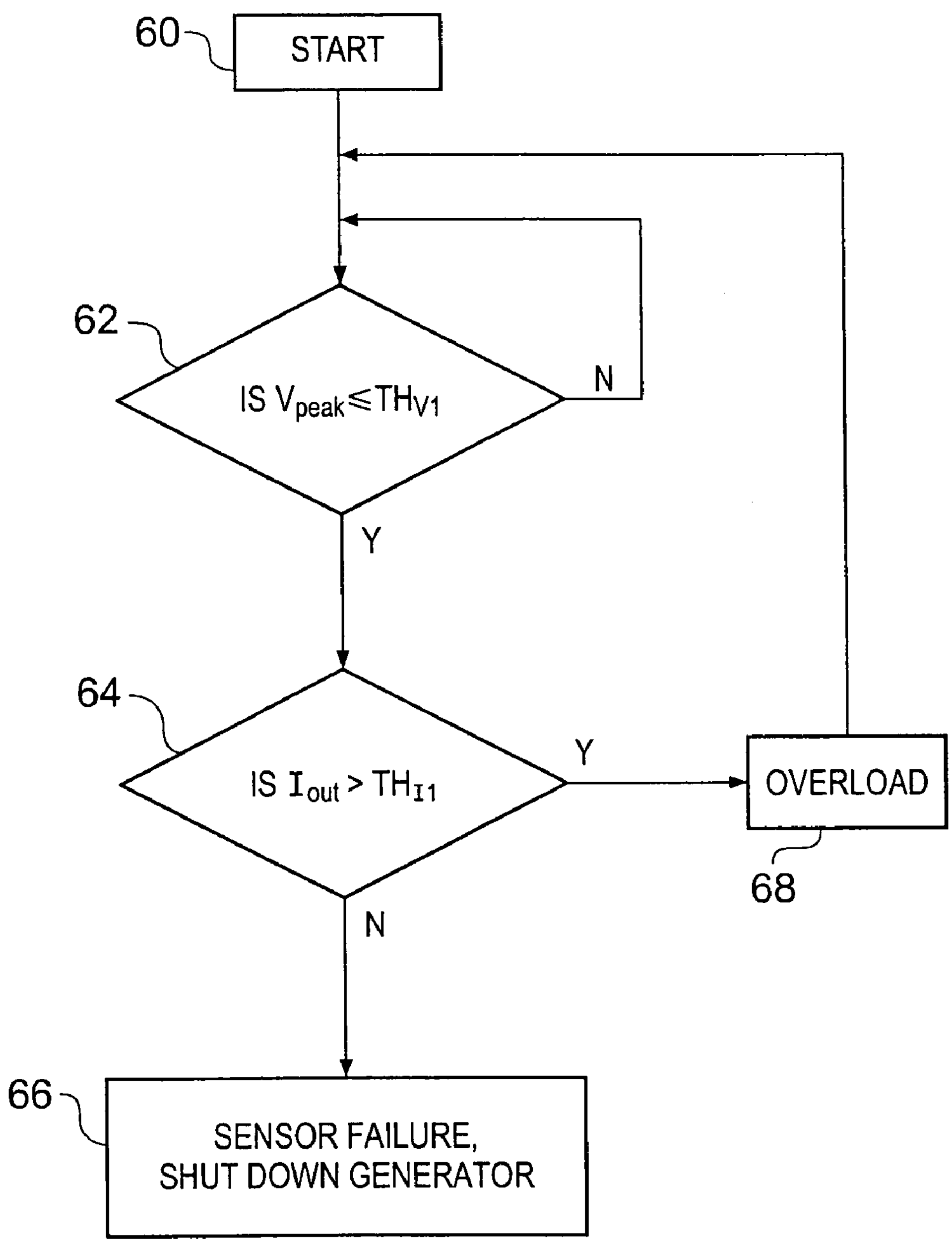
FIG. 3 is a flow chart illustrating the decision process according to the present invention.

FIG. 3 shows the decision process performed by the logic block 50. Control commences at step 60. From here, control is passed to step 62 where the output $V_{peak}$ of the peak rectifier 30 is compared with a first voltage threshold $TH_{v1}$. If the voltage is less than $TH_{v1}$ then control is passed to step 64 otherwise control loops round to the beginning of step 62 again. At step 64 the generator output current $I_{out}$ is compared with a first current threshold $TH_{I1}$. If the output current is less than $TH_{I1}$ then control passes to step 66 which is indicative of a sensor failure and generator shut down is initiated by sending a signal to the latch 32. However, if the generator output current is greater than the first current threshold $TH_{I1}$ then control passes to step 68 which indicates a possible overload condition where generator protection measures may invoked. From step 68 control is passed back to the beginning of step 62. It will be appreciated that the implementation of the flow diagram of FIG. 3 can be achieved equally easily in both hardware and software. A hardware implementation is preferred as this is likely to be more reliable. The voltage and current threshold chosen will vary with nominal output voltage and generator size. However for a 115V system having a 150 KVA generator a voltage threshold of 50 Volts and a current threshold of 600 Amperes seem appropriate.

Figure 4:
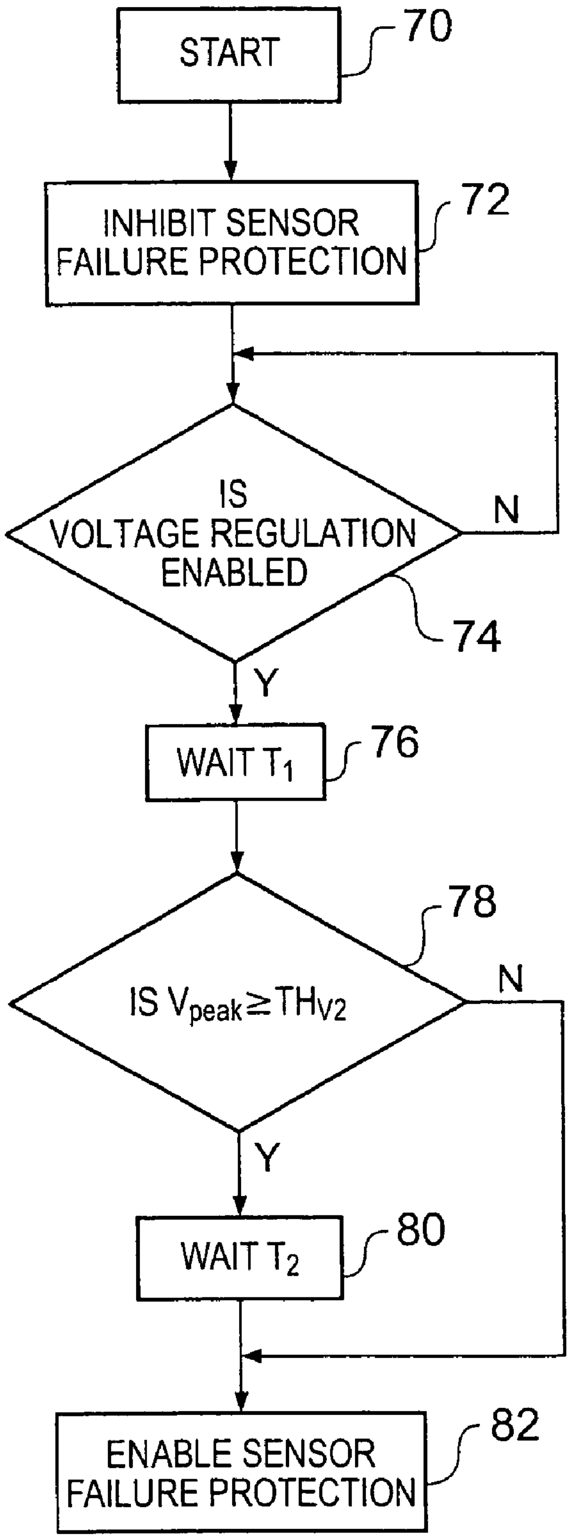
FIG. 4 is a flow chart illustrating the operation of the present invention during a start up phase.

FIG. 4 illustrates a modification to the generator protection scheme which is initiated during the start up phase. Control commences at step 70 from where control is passed to step 72 where the sensor failure protection (i.e. generator shutdown if the voltage sensors are deemed to have failed) is temporarily inhibited. From step 72 control is passed to step 74 where a test is repeatedly made to see whether generator voltage regulation has been enabled, which corresponds to instructing the generator to supply power. Once the generator voltage regulation is enabled control is passed to step 76 where a period T1 is timed. The period T1 is typically in range of 6 to 20 milliseconds. Control is then passed to step 78 where the voltage Vpeak is compared with a second voltage threshold $TH_{V2}$. The second voltage threshold $TH_{V2}$ typically has a value of 12 volts or so. If Vpeak is greater than $TH_{V2}$ then it is assumed that the voltage sensors are operating correctly and control is then passed to step 80 where a further period T2 of around 80 milliseconds is timed out before control is passed to step 82 where the sensor failure protection is re-enabled. Thus it will be seen that sensor failure protection is inhibited for a period of approximately 100 milliseconds following initiation of the instruction to the generator to start providing a regulated output. However, if step 78 determines that the measured generator peak output voltage Vpeak is less than $TH_{V2}$ then it is immediately assumed that the voltage sensors are not operating and control is passed to step 82 where the voltage sensor protection is enabled. This will, of course, immediately seek to determine whether the generator output is short circuited or whether voltage sensor failure has indeed occurred and will take appropriate action.

Figure 5:
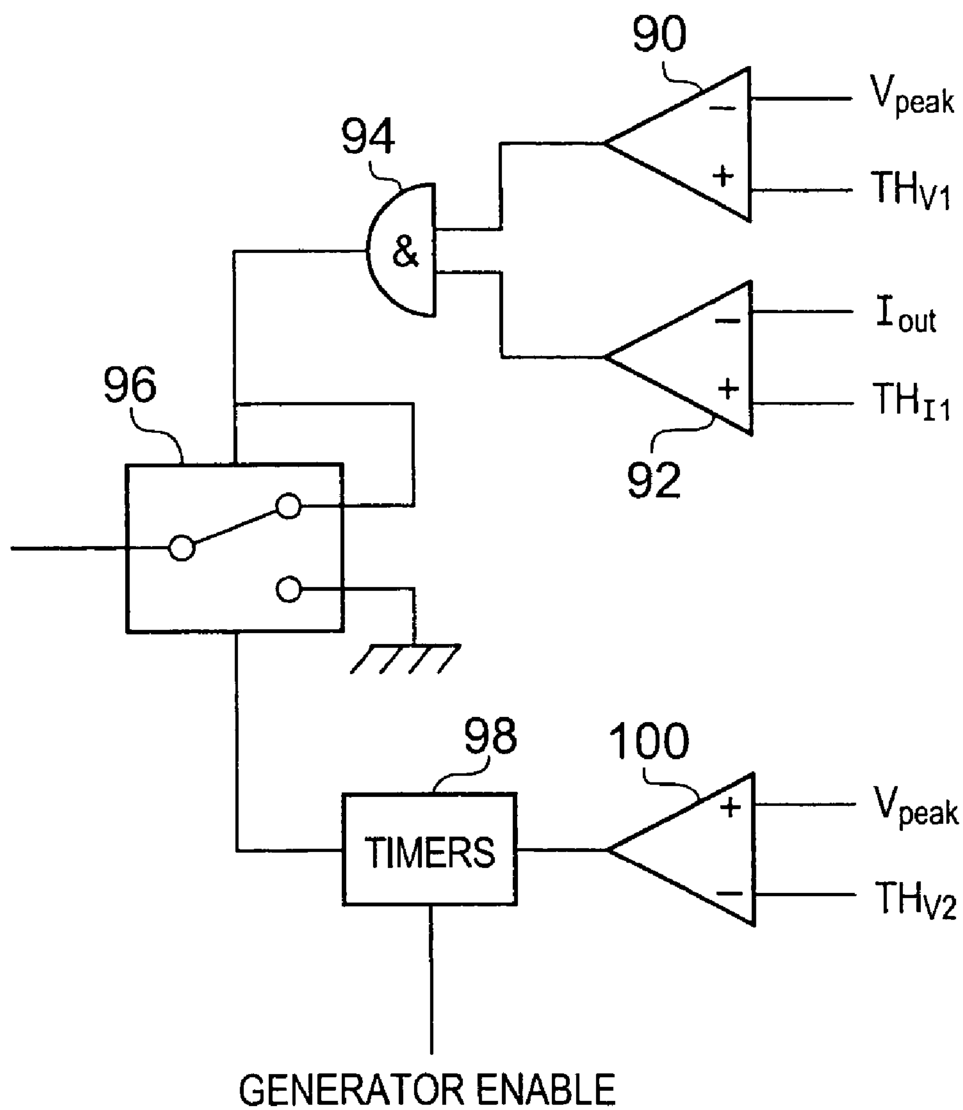
FIG. 5 is a circuit diagram for a hardware based arrangement for detecting sensor failure and for initiating generator shutdown.

FIG. 5 schematically illustrates the circuit diagram for the logic circuit 50. The logic circuit comprises a comparator 90 having an inverting input connected to the output of the peak rectifier 30 and a non-inverting input connected to receive voltage threshold $TH_{V1}$. An output of the comparator 90 is supplied to a first input of an AND gate 94. A second comparator 92 has an inverting input connected to the generator output current measuring element 52 and a non-inverting input connected to receive the first current threshold $TH_{I1}$. An output of the comparator 92 is connected to a second input of the AND gate 94. An output of the AND gate 94 is connected to a first input of an electronically operated switch 96. The switch 96 is controlled such that following generator start up it supplies the output of the AND gate 94 to the latch 32. However, during a generator start up phase the switch 96 is controlled so as to disconnect the output of the AND gate 94 from the latch 32. The switch 96 is controlled by a timer 98 which has a first input responsive to a generator enable signal used to switch the generator on and the second input responsive to an output of a further comparator 100 which has its non-inverting input connected to receive the rectifier output voltage Vpeak and its inverting input connected to receive a second voltage reference $TH_{V2}$. Thus the comparator 100 performs the comparison of step 78.

It is thus possible to provide a generator controller which can detect failure of its voltage sensing elements and initiate a generator shut down in order to ensure that devices connected to the generator cannot be damaged by generator over voltage.

What is claimed is:

1. A generator controller responsive to at least one voltage sensor for measuring a generator output voltage of a controlled generator controlled by the generator controller, wherein the generator controller is responsive to at least one current measuring device for measuring a generator output current, and wherein the generator controller is arranged to shut down the controlled generator if the measured generator output voltage is less than a first voltage threshold and the measured generator output current is less than a current threshold.

2. A generator controller as claimed in claim 1, wherein the generator controller is arranged to signal the occurrence of a generator overload and/or invoke an overload protection measure if the measured output voltage is less than the first voltage threshold and the measured current is greater than the current threshold.

3. A generator controller as claimed in claim 1, wherein the generator controller is responsive to a plurality of voltage sensors for measuring a plurality of phases of a multiphase generator and to compare the largest voltage with the first voltage threshold.

4. A generator controller as claimed in claim 1, wherein during a generator start-up phase the operation of the generator controller is modified such that during a first time period the generator controller is not responsive to the measured generator output voltage.

5. A generator controller as claimed in claim 4, wherein the generator controller is adapted to compare the measured generator output voltage with a second voltage threshold following the end of the first time period and the at least one voltage sensor is assumed to be functioning correctly if the measured output voltage is greater than the second voltage threshold.

6. A generator controller as claimed in claim 5, wherein once the generator controller has determined that the at least one voltage sensor is functioning correctly the controller waits for a further time period before invoking sensor failure protection wherein the generator controller deduces that a fault has occurred in at least one voltage sensor by virtue of the measured generator output voltage being less than the first voltage threshold and the measured generator current being less than the current threshold.

7. A generator control system, comprising a generator controller as claimed in claim 1 in combination with at least one voltage sensor and at least one current measuring device.

8. A generator in combination with a generator control system as claimed in claim 7.

9. A generator controller arranged to detect failure of a first voltage sensor provided for measuring an output voltage of a generator, wherein the generator controller is responsive to a current sensor provided for measuring an output current of the generator and the generator controller detects that the first voltage sensor is not functioning correctly when the measured generator output voltage is less than a first voltage threshold and the measured output current is less than a current threshold.

10. A method of detecting voltage sensor failure of a generator control system having a first voltage sensor for measuring an output voltage of a generator, characterised by the steps of measuring an output current of the generator and determining the first voltage sensor to have failed if, during operation of the generator, the measured output voltage of the generator is less than a first voltage threshold and the measured generator output current is less than a current threshold.

11. A method as claimed in claim 10, in which the first voltage threshold is less than the nominal output voltage of the generator.

12. A method as claimed in claim 10, in which a generator overload condition is determined if, during operation of the generator, the measured output voltage of the generator is less than the first voltage threshold and the measured generator output current is more than the current threshold.

13. A method as claimed in claim 10, in which determination of voltage sensor failure is inhibited during a start up phase of the generator.

14. A method as claimed in claim 13, in which during a generator start up the measured generator output voltage is compared with a second voltage threshold after a first time period has elapsed following initiation of start up and the first voltage sensor is deemed to be functioning correctly if the measured generator output voltage exceeds the second voltage threshold.

15. A method as claimed in claim 14, in which the generator start up phase is deemed to have finished following the end of a further time period.

16. A method as claimed in claim 10, in which determination of voltage sensor failure is modified during a start up phase of the generator.

* * * * *